Feb. 24, 1970     K. F. UMPLEBY     3,497,266
CONTROL FOR ELECTRIC BRAKE
Filed March 8, 1968                                      2 Sheets-Sheet 1

INVENTOR
KENNETH F. UMPLEBY

BY
ATTORNEYS

Feb. 24, 1970  K. F. UMPLEBY  3,497,266
CONTROL FOR ELECTRIC BRAKE
Filed March 8, 1968  2 Sheets-Sheet 2
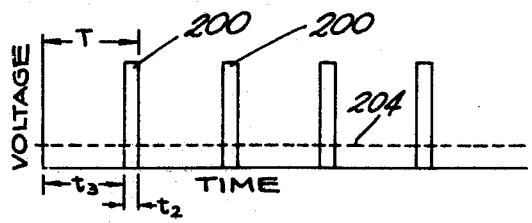
FIG. 4a
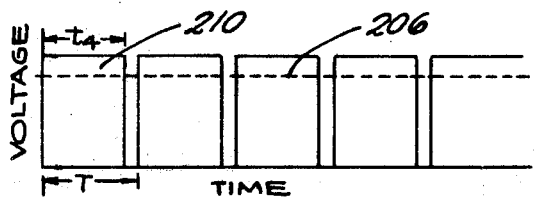
FIG. 4b
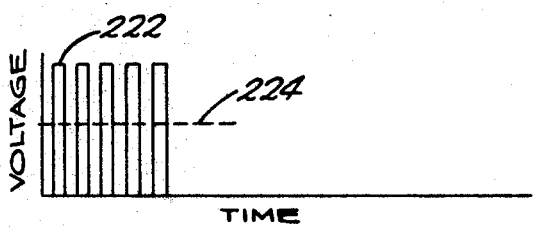
FIG. 5
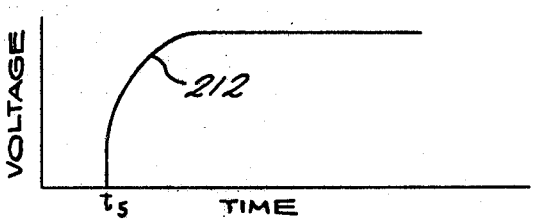
FIG. 6a
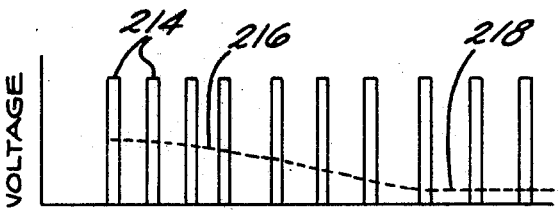
FIG. 6b
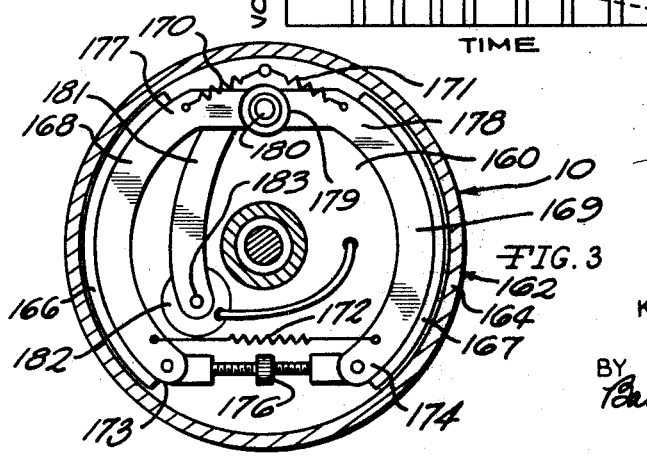
INVENTOR
KENNETH F. UMPLEBY
BY
ATTORNEYS

United States Patent Office 3,497,266
Patented Feb. 24, 1970

3,497,266
CONTROL FOR ELECTRIC BRAKE
Kenneth F. Umpleby, Ann Arbor, Mich., assignor to Motor Wheel Corporation, Lansing, Mich., a corporation of Ohio
Filed Mar. 8, 1968, Ser. No. 711,564
Int. Cl. B60t 7/20
U.S. Cl. 303—3                                16 Claims

ABSTRACT OF THE DISCLOSURE

The energizing coil of an electric brake in a towed vehicle such as a trailer or the like is energized by pulsating direct current. The duty cycle or pulse-width ratio of the energizing current is controlled by a free-running multivibrator which, in turn, is hand-controlled by the driver in the towing vehicle. The hand control can be overridden by an auxiliary hydraulic cylinder and cable system operated by the hydraulic braking system in the towing vehicle. The multivibrator circuitry provides an initial surge current to the electric brake coils when the electric brake is first energized.

---

Objects of the present invention include providing an electric brake system particularly adapted for a towed vehicle wherein a manually operated control for the electric brakes can be overridden by operating the brakes of the towing vehicle by an improved arrangement that is simple in construction, economical to manufacture, easily installed on towing vehicles having hydraulically operated brakes of conventional construction and operates safely without likelihood that failure in hydraulic brakes in the towing vehicle will be caused by failure in the overriding arrangement.

Other objects, features and advantages of the present invention will become apparent in connection with the following description, the appended claims and the accompanying drawings in which:

FIG. 3 shows one type of electric brake usable with the brake control system of the present invention;

FIGS. 4a and 4b show waveforms illustrating low duty-cycle operation and high duty-cycle operation, respectively, of the brake controller circuit of FIG. 1;

Figure 1:
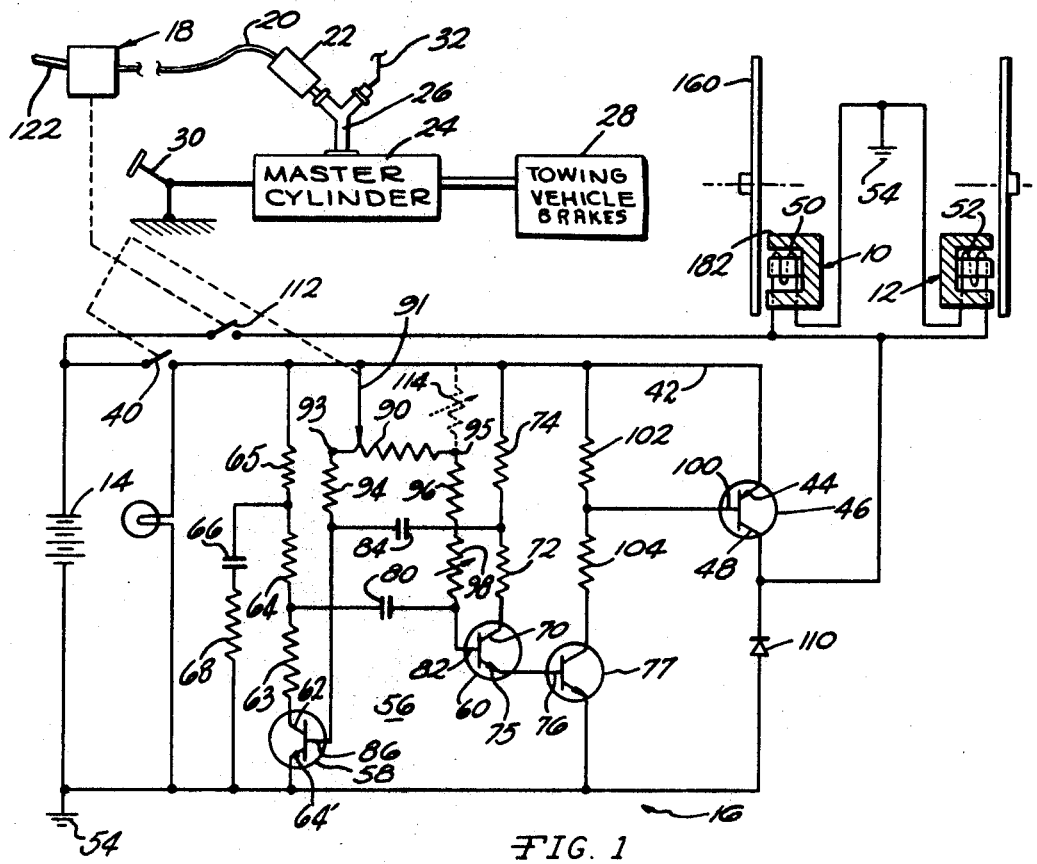
FIG. 1 illustrates an electric brake for a trailer or the like wherein the electric brake is remotely and hand controlled by the driver in a towing vehicle.

FIG. 5 shows a waveform illustrating operation of the brake controller circuit in FIG. 1 in a modified embodiment of the present invention wherein the electric brake control circuit is under the control of a pressure-sensitive resistor directly responsive to operation of the hydraulic brakes of the towing vehicle; and FIGS. 6a and 6b show waveform illustrating voltages appearing in the circuit of FIG. 1 upon actuation of the electric brake controller to provide a momentary high power to the electric brake.

Referring more particularly to FIG. 1, the electric brake system generally comprises a pair of electromagnetic brakes 10, 12 (FIGS. 1 and 3) which are arranged to be energized from a battery 14 by the control circuit designated generally at 16. In the preferred embodiment, brakes 10, 12 are mounted on the wheels of a towed vehicle such as a trailer and the like. Control circuit 16 is actuated via a manually operated controller 18 mounted in the towing vehicle at a location convenient for operation by the driver. A flexible cable 20 connects controller 18 to an auxiliary fluid cylinder 22 mounted on a master cylinder 24 by a Y fitting 26. Master cylinder 24 is part of the conventional hydraulic brake system in the towing vehicle to operate the towing vehicle brakes 28 in response to actuation of a foot pedal 30. Fitting 26 is mounted directly on cylinder 24 in place of and interchangeably with a stop light switch which would otherwise be normally mounted on conventional master cylinders. The stop light switch 32 is then mounted on one arm of fitting 26. In general, the electric brakes 10, 12 can be hand operated by the driver via controller 18 but manual operation of the controller 18 can be overridden via cable 20 and cylinder 22 in response to actuation of brakes 28 when pedal 30 is depressed.

Referring more particularly to circuit 16, battery 14 is the towing vehicle battery and the positive terminal of battery 14 is arranged to be connected through a normally closed switch 40 (FIGS. 1 and 2) and a lead 42 to the emitter 44 of an output switching transistor 46. Switch 40 is also mechanically coupled to controller 18 as indicated by dashed lines in FIG. 1. The collector 48 of transistor 46 is connected in series with parallel-connected energizing coils 50, 52 in brakes 10, 12, respectively, and then to ground 54. The transistor 46 is controlled by a free-running multi-vibrator 56 comprising first and second transistors 58, 60. The collector 62 of transistor 58 is connected in series with three resistors 63, 64, 65 to lead 42, and the emitter 64' is connected to ground. A capacitor 66 is connected in series with a resistor 68 between ground and the junction between resistors 64, 65. Transistor 60 has its collector 70 connected in series with resistors 72, 74 to lead 42 and its emitter 75 connected in an emitter-follower configuration to the base 76 of a drive transistor 77. The collector outputs of transistors 58, 60 are cross-coupled in a generally conventional manner by means of capacitors 80, 84. Capacitor 80 is connected between the base 82 of transistor 60 and the junction of resistors 63, 64, and capacitor 84 is connected between the junction of resistors 72, 74 and the base 86 of transistor 58. Resistors 63, 72 prevent excessive reverse bias voltages.

The bias circuit for the base-emitter circuits of transistors 58, 60 includes a potentiometer 90 having its wiper 91 electrically connected to lead 42 and mechanically coupled to the controller 18 as indicated by dashed lines in FIG. 1. One terminal 93 of potentiometer 90 is connected to base 86 through a resistor 94 and the other potentiometer terminal 95 is connected to base 82 through serially connected resistors 96, 98. Resistor 98 is adjustable to balance the braking action of brakes 10, 12 with the braking action of brakes 28 and adjust the sensitivity for manual operation of controller 18.

Transistor 77 drives the base 100 of transistor 46 via resistors 102, 104. The emitter-collector circuit of transistor 46 is connected in series with the paralleled coils 50, 52. A silicon diode 110 is connected between ground 54 and the collector 48 of transistor 46 across the paralleled coils 50, 52. Diode 110 is poled to block current therethrough when transistor 46 is conducting and to provide a return path for circulating currents from coils 50, 52 when transistor 46 is switched off. Coils 50, 52 are also arranged to be connected directly across battery 14 through a normally open switch 112, bypassing circuit 16.

A variable resistor 114 is also shown in FIG. 1 in dotted lines connected between potentiometer terminal 95 and lead 42 to illustrate an alternative embodiment of the present invention. Resistor 114 is a pressure sensitive resistor whose value changes in response to fluid pressure applied thereto. In the alternative embodiment, resistor 114 is mounted directly on fitting 26 in place of cylinder 22 to respond to variations in brake fluid pressure in the master cylinder 24.

Figure 2:
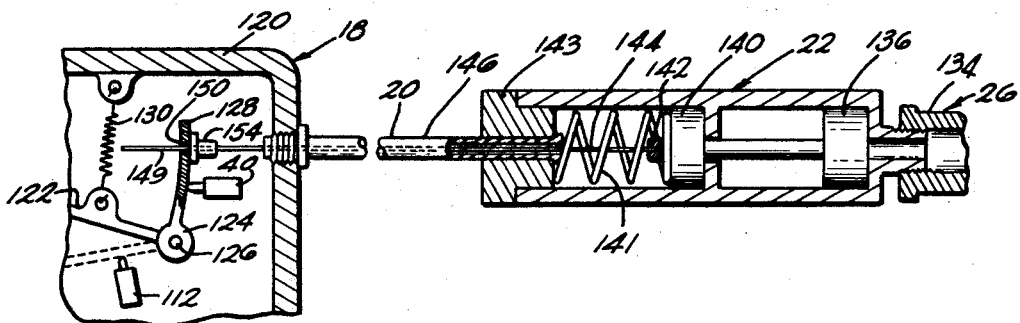
FIG. 2 is a fragmentary view partly in section and illustrating an auxiliary hydraulic cylinder and cable system interconnecting the hydraulic braking system of the towing vehicle to the electric brake control.

Referring more particularly to FIG. 2, the controller 18 comprises a housing 120 which is mounted by suitable means (not shown) on the dash board, underneath the instrument panel, of the towing vehicle. Alternatively, housing 120 could be mounted at other convenient locations in the towing vehicle such as on the steering column. A control lever 122 integral with a shaft 124 is pivotally mounted at 126 on housing 120. The free end of lever 122 projects outwardly through the front of housing 120 for hand actuation of the electric brakes 10, 12. An integral crank arm 128 on shaft 124 is disposed at approximately a right angle to lever 122 to project upwardly as viewed in FIG. 2. Switch 40 (FIGS. 1 and 2) is mounted on housing 120 to be actuated by arm 128 to an open position when arm 128 is in the position illustrated in full lines in FIG. 2 which corresponds to a condition when brakes 10, 12 are "fully off." Arm 128 and lever 122 are urged toward the "fully off" position by a spring 130. Switch 40 limits pivotal movement of arm 128 at the off position although other suitable stop means may be used. Switch 112 (FIGS. 1 and 2) is mounted on case 120 for engagement by lever 122 when lever 122 is moved downwardly to the position illustrated in dotted lines which corresponds to a "fully on" condition of brakes 10, 12. The components of circuit 16 are also mounted within housing 120 and the wiper arm 91 of potentiometer 90 is connected directly to shaft 124 so that rotation of shaft 124 in response to pivotal movement of lever 122 varies the potentiometer setting.

Cylinder 22 is mounted directly on fitting 26 by a suitable fitting 134 at the inlet end of cylinder 22. Cylinder 22 comprises a piston 136 having a suitable seal (not shown), commonly an O-ring or a cup seal. Piston 136 is actuated from right to left as viewed in FIG. 2 in response to hydraulic fluid pressure increases at the master cylinder 24 when pedal 30 is operated. A spring seat 140 is integrally connected to piston 136 for co-movement therewith and a compression spring 141 is mounted between seat 140 and the opposite end wall 143 of the auxiliary cylinder 22 to bias piston 136 in a direction toward the right as viewed in FIG. 2 in the absence of hydraulic pressure at the inlet of cylinder 22.

Cable 20 is a Bowden-type cable having an inner control wire 144 movable longitudinally inside an outer sheath 146. Wire 144 has one end secured in a boss 142 on seat 140 as by a crimped or soldered connection. Sheath 146 extends through the end wall 143 of cylinder 22 and is secured therein by suitable means such as soldering or an appropirate fitting. The other end of the sheath 146 is detachably mounted on the rear wall of housing 120 and the other end 149 of the wire 144 extends into housing 120 and passes freely through a small aperture 150 in the arm 128. A flanged ferrule 154 is secured on wire 144 as by crimped or soldered connection. Ferrule 154 is located at an appropriate point on wire 144 so as to be disposed just behind arm 128 when arm 128 is in its raised, "fully off" position with no fluid braking pressure applied to piston 136.

By way of further disclosure, one of the brakes 10 is shown in greater detail in FIG. 3 to illustrate one type of brake which may be operated by a brake control circuit of the present invention, but it is to be understood that the control circuit and braking system may be used with other types of electric brakes. Disc 160 is located adjacent a brake drum 162 having a rim 164 engageable with linings 166, 167 mounted respectively on conventional brake shoes 168, 169. Brake shoes 168, 169 are retained by springs 170, 171, 172 and their lower ends 173, 174 are connected together by the usual adjustable linkage 176. The upper ends 177, 178 of brake shoes 168, 169 abut an operating cam 179 on a pin 180 affixed to a pivotal lever 181 to which a puck 182 (FIGS. 1 and 3) is attached by means of a pin 183.

Brake drum 162 and disc 160 rotate with the wheel of the vehicle on which they are installed whereas pin 180 and the associated support structure for shoes 168, 169 and lever 181 are mounted stationary relative to the drum.

The function and operation of the control for the electrically operated brake described hereinabove and for the circuit 16 can be best understood in connection with the waveforms shown in FIGS. 4–6. With control arm 122 in its raised "fully off" position engaging switch 40, switch 40 will be open and hence no power from battery 14 is applied to circuit 16. When it is desired to actuate brakes 10, 12, the operator moves lever 122 downwardly causing arm 128 to disengage from switch 40 whereupon switch 40 closes to energize control circuit 16. Simultaneously, the wiper arm 91 is moved from its extreme left-hand position on potentiometer 90 toward the right as viewed in FIG. 1. Disregarding for the moment the effect of capacitor 66 when switch 40 first closes, one of the transistors 58, 60 will conduct initially and establish free-running operation of the multivibrator 56 with transistors 58, 60 being rendered alternately conducting via the conventional cross coupling through capacitors 80, 84. When transistor 60 conducts, transistor 77 is rendered conductive with the emitter current of transistor 60 driving transistor 77 into saturation. Conduction of transistor 77 provides current drive via resistor 104 to transistor 46 to render transistor 46 conducting and thereby connect coils 50, 52 across battery 14. Energization of coils 50, 52 actuates brakes 10, 12.

In general, the braking force applied by the brakes 10, 12 depends primarily on the setting of potentiometer 91, the values of resistors 94, 96 (together with resistor 98) and the timing capacitors 80, 84 and also on the values of resistors 63, 64, 65 and resistors 72, 74. For a small displacement of lever 122, wiper 91 will be moved just slightly from the terminal 93 and in this position the time constants for capacitors 80, 84 are such that during each cycle or repetition period of multivibrator 66, transistor 60 conducts for a short time by comparison to the time during which transistor 58 conducts. Hence the pulse width ratio for the multivibrator output is low and correspondingly the duty cycle at coils 50, 52 is low.

The waveform for the voltage output applied to coils 550, 52 from source 14 during low duty-cycle operation corresponding to low braking force is shown in FIG. 4a. FIG. 4a can also be considered as representing the pulse train developed by multivibrator 56. With wiper 91 positioned at or near the potentiometer terminal 93, a train of pulses 200 will be applied to coils 50 from battery 14. During each cycle T of the multivibrator 56 the duration $t_2$ of each pulse 200 is small compared to the off time $t_3$ and hence the average D.C. power applied to coils 50, 52 over several cycles will be low as indicated by the level 204 (FIG. 4a). During the off time $t_3$, diode 110 prevents the voltage across coils 50, 52 from exceeding the supply voltage of battery 14 due to the inductive loading effect of coils 50, 52, or stated differently, when the fields in coils 50, 52 collapse, diode 110 provides a return path for circulating current through coils 50, 52 during the off time of transistor 46. With the electrical and mechanical time constants of coils 50, 52 and brakes 10, 12 longer than the cycle time T of multivibrator 56, the operation of coils 50, 52 is as though the coils were supplied by the average D.C. voltage level 204.

As higher braking forces are required, lever 122 is moved further downwardly in turn moving the wiper 91 further to the right as viewed in FIG. 1. The time constant for capacitor 84 is increased, increasing the "off time" of transistor 58. Simultaneously the time constant for capacitor 80 is decreased, increasing the "on time" of transistor 60 by an equal amount so that the frequency or cycle time T of the multivibrator 56 does not change.

FIG. 4b illustrates the pulses 210 applied to coils 50, 52 from battery 14 when control lever 122 is moved to an extreme lower position just prior to engagement with switch 112. The cycle time T of multivibrator 56 remains the same whereas the "on time" $t_4$ of transistor 60 is substantially greater than the "on time" $t_2$ (FIG. 4a) at low duty-cycle operation. Hence FIG. 4b illustrates a high duty-cycle operation providing an apparent average D.C. voltage level 206 substantially higher than the corresponding level 204 during the low duty cycle.

Maximum braking forces are applied when lever 122 is moved to its lower-most position engaging with and actuating switch 112 to connect coils 50, 52 directly across battery 14. Switch 112 also provides a safety feature in the event that the remaining portion of control circuit 16 should fail.

With respect to actuation of brake 10, when coil 50 is energized puck 182 is magnetically attracted against the rotating disc 160. Assuming disc 160 is rotating clockwise as viewed in FIG. 3, the frictional forces exerted by disc 160 on puck 182 swings lever 181 on pivot shaft 180 to the left as viewed in FIG. 3. This pivotal movement of lever 181 rotates the operating cam 179 which in turn operates the upper ends of shoes 168, 169 so that the shoes move outwardly to engage linings 166, 167 with drum 162. The shoes are shown in an operated position in FIG. 3. As the pulse width ratio for the multivibrator output is increased, the corresponding increased duty cycle or apparent D.C. level of the current in coil 50 forces puck 182 harder against disc 160, thus increasing the frictionally induced torque in lever 181 and thereby moving puck 182 and lever 181 farther to the left which in turn further increases the applied braking forces.

Referring back to the initial energization of the control circuit 16 and the effect of capacitor 66, just prior to closure of switch 40 there is no charge on capacitor 66 but upon closure of switch 40 the voltage at the juncture between resistors 64, 65 rises instantaneously to a value determined by the values of resistors 65, 68. The effect of capacitor 66 as it charges exponentially to a voltage determined by the average current in transistor 58 and the value of resistor 65 is shown in FIGS. 6a and b. In FIG. 6a the time at which the switch 40 closes is designated $t_5$ and the charging of capacitor 66 is illustrated by the voltage curve 212. The effect of capacitor 66 is to initially increase the frequency of multivibrator 56 as illustrated by the higher frequency pulses 214 (FIG. 6b). The increase in frequency has the corresponding effect in coils 50, 52 of increasing the apparent D.C. level as indicated at 216. As the frequency decreases to a steady state value when capacitor 66 is fully charged, a lower average voltage level 218 is provided. The higher level 216 may be required in certain brake systems to assure that puck 182 is quickly and firmly brought into contact with plate 160. However, it should be understood that in other applications the initial surge feature is not required, and hence capacitor 66 and resistor 88 can be omitted and a single resistor used in place of resistors 64, 65.

With respect to operation of the brakes 10, 12 in response to actuation of the foot brake pedal 30, piston 140 is moved from right to left as viewed in FIG. 2 against the pressure of spring 141 by an increase in fluid pressure in the master cylinder 24 upon operation of foot pedal 30. The resulting movement of wire 144 pushes ferrule 154 against the crank arm 128 to thereby pivot arm 128, shaft 124 and lever 122 from the "fully off" position toward the "fully on" position. The constants of spring 141 are selected to correlate the rotation in arm 128 as a result of given brake pressures with the variation required at potentiometer 90 to balance the brakes 28 with brakes 10, 12. The maximum displacement of spring seat 140 and wire 144 is also chosen to correspond to the maximum travel of lever 122 to just bring lever 122 into engagement with switch 112 and actuate the switch. Hence the degree to which the brakes 10, 12 are actuated upon application of the car brakes 28 is controlled through the brake controller 18 in synchronism with and in proportion to the amount of braking effort being applied to the car brakes 28. When pedal 30 is released, spring 141 forces piston 136 back to its original "fully off" position and spring 130 returns lever 122 back to its "fully off" position. The lost motion connection between wire 144 and arm 128 allows the controller 18 to be manually actuated by lever 122 without affecting the car brakes 28 since arm 128 slides freely along the free end 149 of the wire.

Resistor 98 varies the "off time'" of transistor 60 and incidentally varies the frequency for a given setting of potentiometer 90. Resistor 98 is used to adjust the sensitivity of the trailer brakes 10, 12 for manual operation and the resistor or a variable tap thereon is accessible to the driver. At all settings of resistor 98 the brake response to actuation of lever 122 is linear over the operating range of the lever and the lowest achievable duty cycle remains substantially constant. Stated differently, resistor 98 changes the slope of the straight line response for braking forces versus displacement of lever 122, but the response curve always starts at or near zero. Although a rough balance between the braking effort at the brakes 28 and the brakes 10, 12 is obtained by selection of spring 141, a finer balance is obtained by adjusting resistor 98. Hence the same control circuit 16 can be used with various different types of trailers and various different loads. The resistor 98 is not varied during braking operations.

Attention is now directed to FIG. 5 in connection with the operation of the alternative embodiment wherein resistor 114 replaces cylinder 22 and cable 20. Operation of the foot pedal 30 and the corresponding increase in pressure in master cylinder 24 decreases the value of resistor 114. The connection of resistor 114 in the control circuit 16 is such that variations in resistor 114 affect both the frequency and the duty cycle or pulse width ratio for multivibrator 56. Hence with increased pressure in cylinder 24 and a corresponding decrease in the value of resistor 114, voltage pulses 222 are applied to coils 50, 52. By comparison to FIG. 4a, the frequency of pulses 222 is increased over that of pulses 200 and the "off duty cycle" in FIG. 5 would be decreased for the same setting of potentiometer 90, in turn increasing the apparent voltage to the level 224.

It will be apparent from the foregoing description that the electric brake control of the present invention can achieve smooth and accurate control over a wide range of braking forces. Duty cycles from five percent to ninety-five percent can be achieved in economically practical controls. The frequency of operation of multivibrator 56 remains essentially constant during adjustment of wiper 91. The controller output voltage applied to coils 50, 52 is essentially independent of the load presented by the coils, either due to the variation in the braking forces or to using different types of coils. The output voltage applied to the coils is determined primarily by the voltage at source 14 when transistor 46 is saturated. There is little, if any, heat dissipated by the circuit 16 and most of the energy dissipation occurs during switching of transistor 46 resulting in high electrical efficiency and minimum drain on battery 14. The solid state circuitry and operation of the potentiometer 90 at low-level signals achieves very reliable operation.

The mechanical coupling from the master cylinder to the controller 18 via the auxiliary cylinder 22 and cable 20 provides a very simple construction that is easily installed in the hydraulic brake system of the towing vehicle, especially in combination with the particular control circuit described. The system can be operated either with or without the interconnecting cable system and the cable system can be readily added without major disassembly of the controller 18 and without any modification in the control circuit 16. The auxiliary cylinder 22 and the cable 20 are rugged enough to provide safe operation of both brakes 28 and brakes 10, 12. It is unlikely that the brakes 28 will fail due to failure in the auxiliary cylinder and cable system.

It should be understood that the control for electric brakes has been described hereinabove for purposes of explanation and illustration and is not intended to indicate limits of the present invention.

I claim:

1. In combination with a towed vehicle and a towing vehicle wherein the towing vehicle is equipped with a hydraulic braking system and the towed vehicle is equipped with electrically operated brakes operatively connected to a source of electrical energy and wherein an electric brake controller is mounted in said towing vehicle for manual actuation by the operator of said towing vehicle, circuit means actuated by said manually operable means to vary the electrical energy applied to said electrically operated brakes, transducer means having a fluid inlet and an output member movable in response to pressure variations at said inlet, said transducer means being located remote from said controller and being operatively connected to said hydraulic braking system of said towing vehicle so that variations in the hydraulic pressure in said braking system impart a corresponding movement to said output member, and a mechanical coupling connected between said transducer output member and said manually operable controller to mechanically actuate said controller in response to fluid pressure variations in the hydraulic braking system of said towing vehicle and thereby vary the electrical energy applied to said electrically operated brakes.

2. The combination set forth in claim 1 wherein said mechanical coupling comprises a flexible cable connected at one end in said controller unit and at the other end to said transducer means.

3. The combination set forth in claim 2 wherein said transducer comprises a first hydraulic cylinder, said output member comprises a piston mounted in said cylinder and movable from a first position toward a second position in response to fluid pressure increases in said hydraulic brake system, and wherein a spring is mounted in said cylinder to urge said piston toward said first position.

4. The combination set forth in claim 3 wherein said hydraulic braking system includes a master cylinder and said first cylinder is mounted directly on said master cylinder.

5. The combination set forth in claim 1 wherein said circuit means to vary said current in said electric brakes comprises impedance means having a variable tap, said controller comprises hand-movable means mechanically connected to said tap to vary the same, and wherein said mechanical coupling between said transducer and said controller is connected in said controller to actuate said mechanical coupling between said hand movable means and said tap.

6. The combination set forth in claim 1 wherein said controller comprises a housing, a shaft pivotally mounted on said housing, a lever integral with said shaft and projecting outwardly therefrom through said housing to be accessible by the operator of said towing vehicle, and a crank arm integral with said shaft for co-movement with said lever arm, said transducer means comprises a hydraulic cylinder, said output member comprises a piston mounted in said cylinder, and wherein said mechanical coupling between said transducer means and said controller comprises a flexible cable connected at one end to said piston and at the other end to said crank arm.

7. The combination set forth in claim 6 wherein said crank arm has an aperture therethrough and wherein said other end of said cable passes through said aperture, means biasing said control arm toward a first position corresponding to a "fully off" condition of said electrical brakes and a "fully off" condition of said hydraulic braking system, and stop means on said cable adapted to engage said crank arm when said cable is displaced in response to fluid pressure in said hydraulic braking system and to thereby pivot said arm toward a "fully on" position.

8. The combination set forth in claim 7 wherein said stop means is disposed at one side of said crank arm, said cable passes freely through said aperture and extends outwardly from the other side of said crank arm so that when said lever is manually moved toward its "fully on" position said crank arm pivots on said shaft and slides longitudinally along said cable toward the free end thereof while said cable is stationary.

9. The combination set forth in claim 7 wherein said circuit means comprises a first normally closed switch to connect said source to said circuit to thereby energize said circuit and wherein said switch is arranged and disposed in said controller for actuation to an open position when said lever is in said "fully off" position to disconnect said circuit from said source.

10. The combination set forth in claim 7 comprising second circuit means for directly connecting said electric brakes to said source, a normally open switch in said second circuit means and operative to normally disconnect said electric brake from said source, and wherein said switch means is arranged and disposed in said controller for actuation to its closed position in response to movement of said lever to a "fully on" position.

11. The combination set forth in claim 8 wherein said cable comprises an outer sheath and an inner wire operatively disposed inside said sheath for movement longitudinally therein, one end of said sheath is fixedly mounted on said controller and the opposite end of said sheath is fixedly mounted on said cylinder and said inner wire is connected at one end to said piston and at its other end to said crank arm, said cable being a compression cable such that when fluid pressure causes motion of said piston, said piston pushes said inner wire and said inner wire in turn pushes said crank arm.

12. The combination set forth in claim 2 wherein said circuit means includes a potentiometer to cause variations in current through said coil and wherein said potentiometer is connected to a shaft rotatably mounted in said controller, a hand-operated member to rotate said shaft, and wherein said cable is operatively connected to said shaft to rotate said shaft in response to fluid pressure variations at said transducer means.

13. The combination set forth in claim 12 wherein said means operatively connecting said cable to said shaft comprises a lost-motion connection operable to permit manual actuation of said hand-operated member without actuating said cable.

14. In combination with a hydraulic braking system, an electrically operated brake system operatively connected to a source of electrical energy, said electrically operated brake system including an electric brake controller mounted for manual actuation by the operator of said hydraulic braking system, circuit means actuated by said manually operable means to vary the electrical energy applied to said electrically operated brake system, transducer means having a fluid inlet and an output member movable in response to pressure variations at said inlet, said transducer means being operatively connected to said hydraulic braking system so that variations in the hydraulic pressure in said braking system impart a corresponding movement to said output member, and a mechanical coupling connected between said transducer output member and said manually operable controller to mechanically actuate said controller in response to fluid pressure variations in the hydraulic braking system and thereby vary the electrical energy applied to said electrically operated brakes.

15. The combination set forth in claim 14 wherein said mechanical coupling comprises a flexible cable connected at one end in said controller unit and at the other end to said output member.

16. The combination set forth in claim 15 wherein said flexible cable is a Bowden-type cable having an inner wire operatively connected at one end in said controller unit and at the other end to said movable member so that increased pressure in said hydraulic braking system causes said output member to push said inner wire and thereby transmit the motion of said output member to said controller unit through said inner wire.

References Cited

UNITED STATES PATENTS 3,423,135   1/1969   Beltramo _____ 303—3

DUANE A. REGER, Primary Examiner

U.S. Cl. X.R.

303—20